(12) United States Patent
Klais

(10) Patent No.: US 6,367,826 B1
(45) Date of Patent: Apr. 9, 2002

(54) CAMBER/CASTER ADJUSTER

(75) Inventor: Matthew E. Klais, Waterford, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/615,229

(22) Filed: Jul. 13, 2000

(51) Int. Cl.⁷ .............................................. B62D 17/00
(52) U.S. Cl. .............................. 280/86.751; 280/86.755
(58) Field of Search ...................... 280/86.75, 86.751, 280/86.752, 86.753, 86.754, 86.755, 86.757, FOR 112; 403/4, 408.1; 74/422

(56) References Cited

U.S. PATENT DOCUMENTS

| | | | |
|---|---|---|---|
| 1,453,525 A | 5/1923 | Ross | |
| 3,887,211 A | 6/1975 | Mazur | |
| 3,999,779 A | 12/1976 | Bishop | |
| 4,267,896 A | * 5/1981 | Hendriksen | .............. 280/86.75 |
| 4,479,734 A | 10/1984 | Rother | |
| 4,714,262 A | 12/1987 | Wood | |
| 5,052,711 A | * 10/1991 | Pirkey et al. | .......... 280/86.753 |
| 5,382,043 A | 1/1995 | Jordan | |
| 5,549,319 A | 8/1996 | Kring | |
| 5,647,606 A | 7/1997 | Jordan | |
| 5,826,894 A | * 10/1998 | McDonald et al. | .... 280/86.756 |

FOREIGN PATENT DOCUMENTS

DE 3820642 * 12/1989

* cited by examiner

Primary Examiner—J. J. Swann
Assistant Examiner—David R. Dunn
(74) Attorney, Agent, or Firm—Ralph E. Smith

(57) ABSTRACT

An alignment adjuster for wheel alignment of a motor vehicle is provided. The alignment adjuster includes a shaft that is moveable within an elongated slot. The adjustable member in the preferred embodiment is a lower control arm and is attached via bushing to the shaft. The shaft includes a pinion gear that operatively contacts a rack element that is disposed near the elongated slot. Rotation of the shaft will initiate lateral movement of the shaft in the elongated slot.

3 Claims, 3 Drawing Sheets

CAMBER/CASTER ADJUSTER

BACKGROUND OF THE INVENTION

1. Technical Field

The present invention relates in general to motor vehicles. More particularly, the present invention relates to a mechanism for adjusting the camber and caster of the wheels of a motor vehicle. More specifically, but without restriction to the particular embodiment and/or use which is shown and described for purposes of illustration, the present invention relates to an adjustment mechanism that provides controlling movement to the lower control arm of a vehicle.

2. Discussion

Proper alignment of the vehicle's wheels are essential for a comfortable ride, ease of steering, extended tire life, and reduced road noise and vibration. Many alignment angles have been defined to assist in properly designing and aligning the wheels of a vehicle. Caster is the angle of the steering axis of a wheel from its vertical viewed from a lateral side of the vehicle. Camber is the angle of the wheel from its vertical viewed from the front of the vehicle.

The camber and caster of a vehicle can change over time as the vehicle wears and absorbs shocks and vibrations. Manufacturers, therefore, design vehicles to provide a means for adjusting the camber and caster. An effective method of providing such an adjustment mechanism is illustrated on the 2000 Toyota Tundra. This vehicle provides an adjustment mechanism where the lower control arm is attached to the vehicle frame. The adjustment mechanism includes an off-center cam that carries the bushing that attaches the lower control arm to the frame. The off-center cam can be rotated to move the lower control arm inboard and outboard laterally which affects the cam and caster of the wheel. Other prior art systems also include an off-center cam that provides for the adjustment, however, the amount of lateral movement is dependent upon the size of the off-center cam. This creates packaging concerns that may adversely affect surrounding components in an undesirable way. There is, therefore, a desire to provide a camber caster adjustment system that provide the necessary amount of lateral movement in a more compact design.

SUMMARY OF THE INVENTION

Accordingly, it is the principal objective of the present invention to provide an alignment adjuster that provides adequate lateral adjustment.

It is another objective of the present invention to provide an alignment adjuster that is compact in design to alleviate packaging concerns.

In one form, the present invention concerns an alignment adjuster for a motor vehicle. The alignment adjuster includes a shaft that is moveable within an elongated slot. The adjustable member in the preferred embodiment is a lower control arm and is attached via bushing to the shaft. The shaft includes a pinion gear that operatively contacts a rack element that is disposed near the elongated slot. Rotation of the shaft will initiate lateral movement of the shaft in the elongated slot due to the rack element and pinion gear interaction.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be read in conjunction therewith, and like reference numerals are employed to designate identical components in various views.

DETAILED DESCRIPTION OF THE PREFERRED EMBODIMENT

An alignment adjuster for a motor vehicle is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 1:
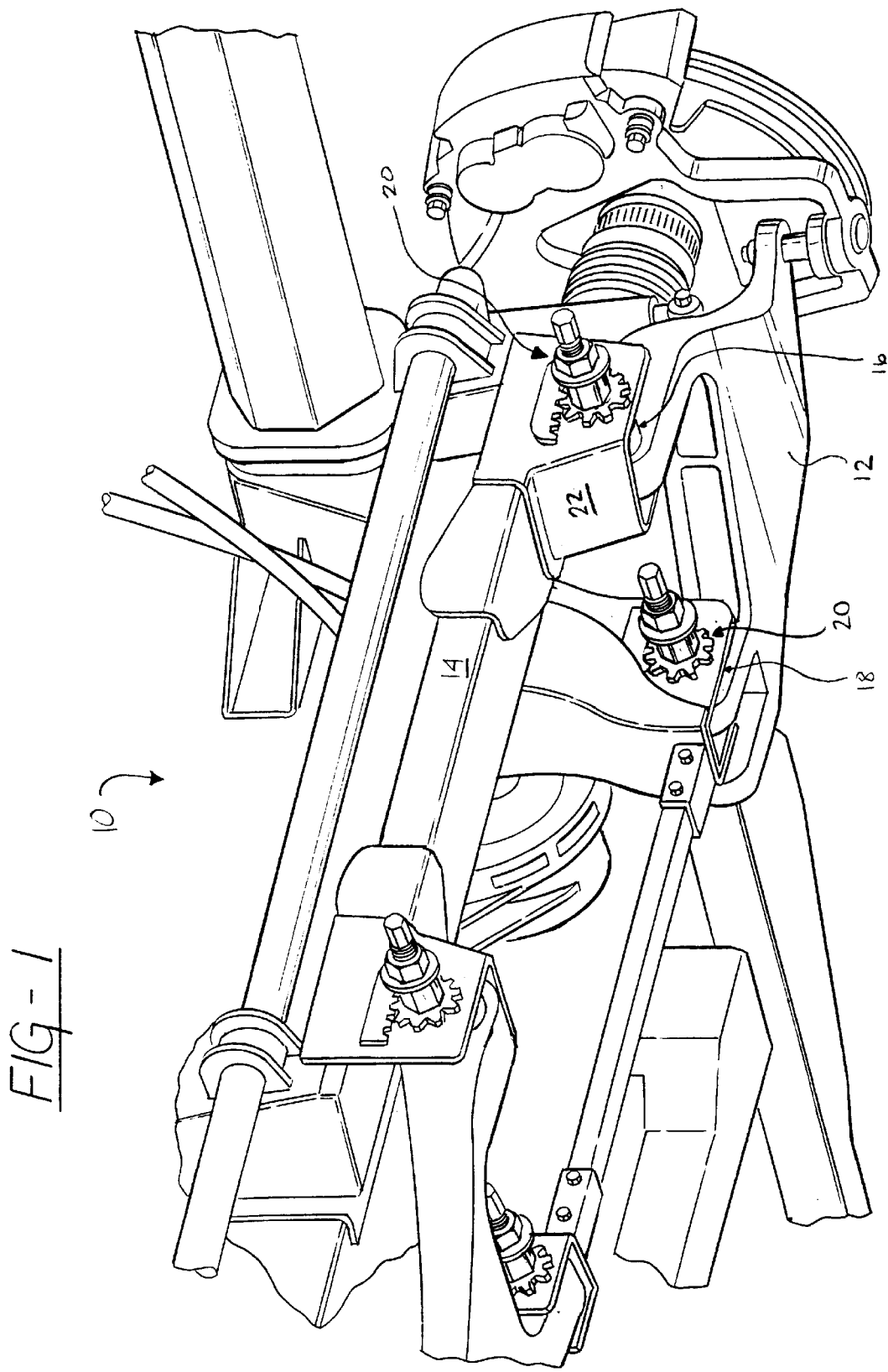
FIG. 1 is a perspective view of the front steering and suspension system of a motor vehicle including the vehicle left hand side lower control arm and illustrating the alignment adjuster of the present invention.

Referring now to the drawings, FIG. 1 illustrates a front steering and suspension system 10 of a motor vehicle. System 10 includes a lower control arm 12 that is adapted to provide a support link for a wheel (not shown) to a vehicle frame 14. Lower control arm 12 is pivotally attached to frame 14 at a front bushing 16 and a rear bushing 18. Vertical movements of the associated wheel causes lower control arm 12 to pivot about an axis formed through front bushing 16 and rear bushing 18.

Front bushing 16 of lower control arm 12 is attached to frame 14 through an alignment adjuster, specifically in the preferred embodiment a camber/caster adjuster 20. The camber/caster adjusted 20 interconnects to the vehicle frame 14 and the adjustable member, which is the lower control arm 12 in the preferred embodiment. Camber/caster adjuster 20 is secured to a bracket 22 that is fixedly secured to vehicle frame 14. It should be appreciated that rear bushing 18 is attached to frame 14 in a similar manner. Both front bushing 16 and rear bushing 18 can be adjusted independently in the inboard and outboard lateral direction, this adjustment promotes camber and caster changes in the wheel.

Figure 2:
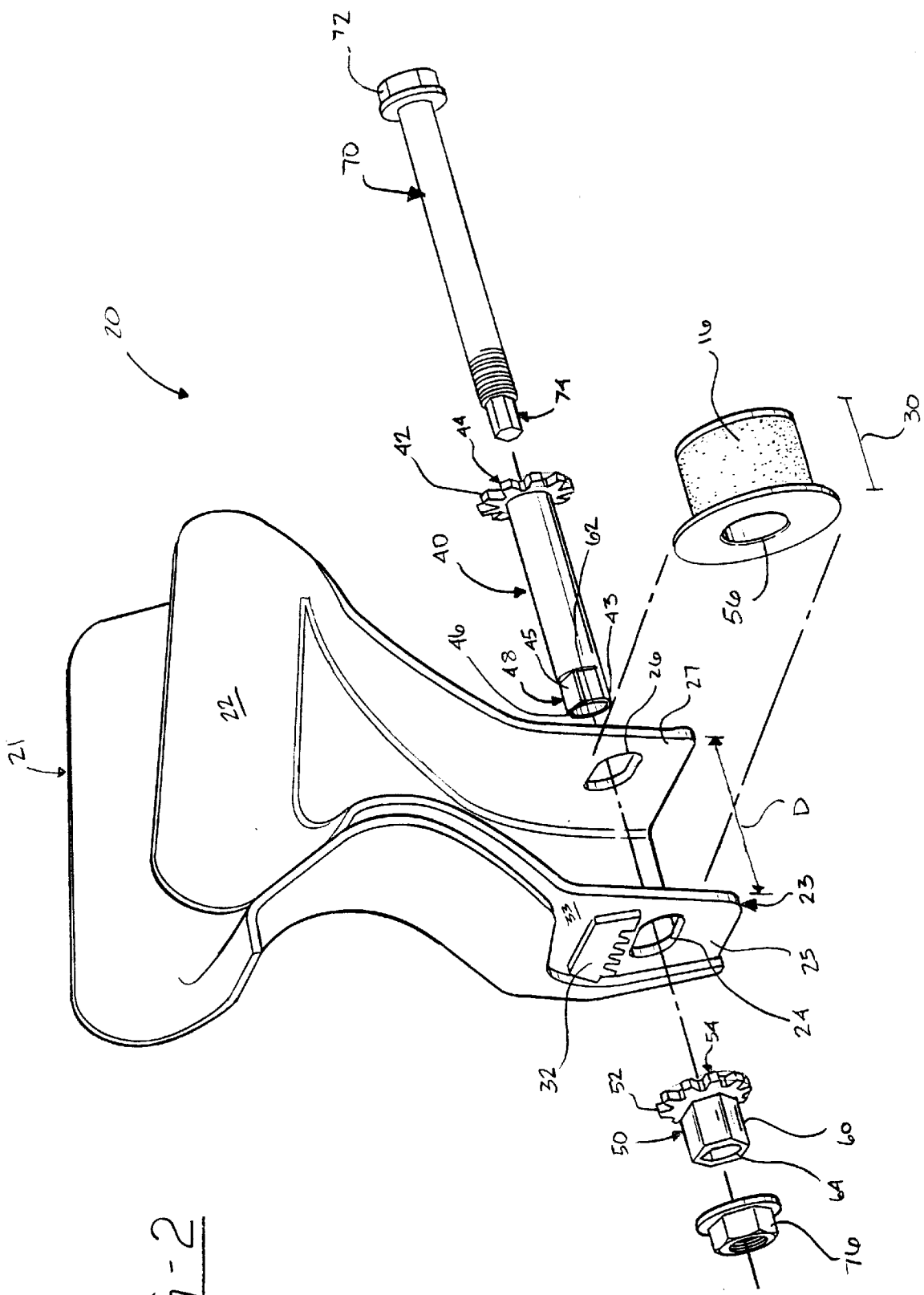
FIG. 2 is an exploded view of the alignment adjuster of the present invention.

Turning now to FIG. 2, an exploded view of the camber/caster adjuster 20 of the present invention is illustrated. Bracket 22 is adapted to be fixedly secured to the vehicle frame at a first end 21 and pivotally secured to the lower control arm at a second end 23. The second end 23 includes two opposing side walls 25 and 27 that are disposed to receive bushing 16 or 18 of the lower control arm 12 therebetween. The distance D between 20 side walls is slightly larger than the width 30 of bushing 16. Although only bushing will be subsequently described in detail, it should be appreciated that bushing 18 and its associated camber/caster adjuster are substantially similar to that described herein. It should also be appreciated that, although not shown FIG. 2, lower control arm 12 is coupled to bushings 16, 18 preferably by providing a bore in which a bushing is inserted into.

Bracket 22 also includes a first slot 24 formed in side wall 25 and a second slot 26 formed in side wall 27. Slots 24 and 26 extend in the lateral direction and are formed in second end 23 of bracket 22. Disposed above first slot 24 is a first rack element 32 secured to the outer surface 33 of side wall 25. Although not shown, a similar rack element is disposed above second slot 26.

The camber/caster adjuster 20 includes a hollow shaft 40 that includes a second pinion gear 42 on its primary end 44 and a locking tab device 46 on its secondary end 48. Locking tab device 46 cooperates with a hollow hex 50 that includes a first pinion gear 52 on a first end 54 thereof. The locking tab 46 cooperates with a mating portion on hollow hex 50 to prevent rotational movement therebetween and also appropriately lines up the first and second pinion gears 42 and 52. Locking tab device 46 and mating portion are preferably formed by a semicircular portion 43 and a plurality of flat surfaces 45 to ensure proper rotational alignment and to prevent rotational movement therebetween. Shaft 40 is inserted through slot 26 and though an opening 56 formed in bushing 16 and also through slot 24. Locking tab 46 of the second end 48 then mates with hollow hex 50. It should be appreciated that with this arrangement as previously described, the first and second pinion gears 52 and 42 are operatively disposed in contact with the first (32) and second rack elements respectively.

Hollow hex 50 includes a hexongally shaped adjustment portion 60. Hexongally shaped adjustment portion 60 is adapted to receive a wrench or similar tool to provide a rotational force to both the hollow hex 50 and the hollow shaft 40. Rotational force causes the hex 50 and shaft 40 to move laterally because of the rack and pinion relationship with the bracket 22.

Hollow shaft 40 has an opening 62 formed therethrough and hollow hex 50 also has a similar opening 64 formed therethough. The openings 62 and 64 are adapted to receive bolt 70 therethrough. The end portion 72 of bolt 70 is larger than opening 62 and therefore establishes a position of bolt 70. Bolt 70 is positioned though the hollow shaft 40 and hollow hex 50 and the bolt's front portion 74 extends therethrough to cooperate with a mating nut 76 that can be tightened to hold the hollow hex 50 and hollow shaft 40 in a specific position. Consequently, bushing 16 is also held a specific position when the nut 76 is tightened to bolt 70.

Figure 3:
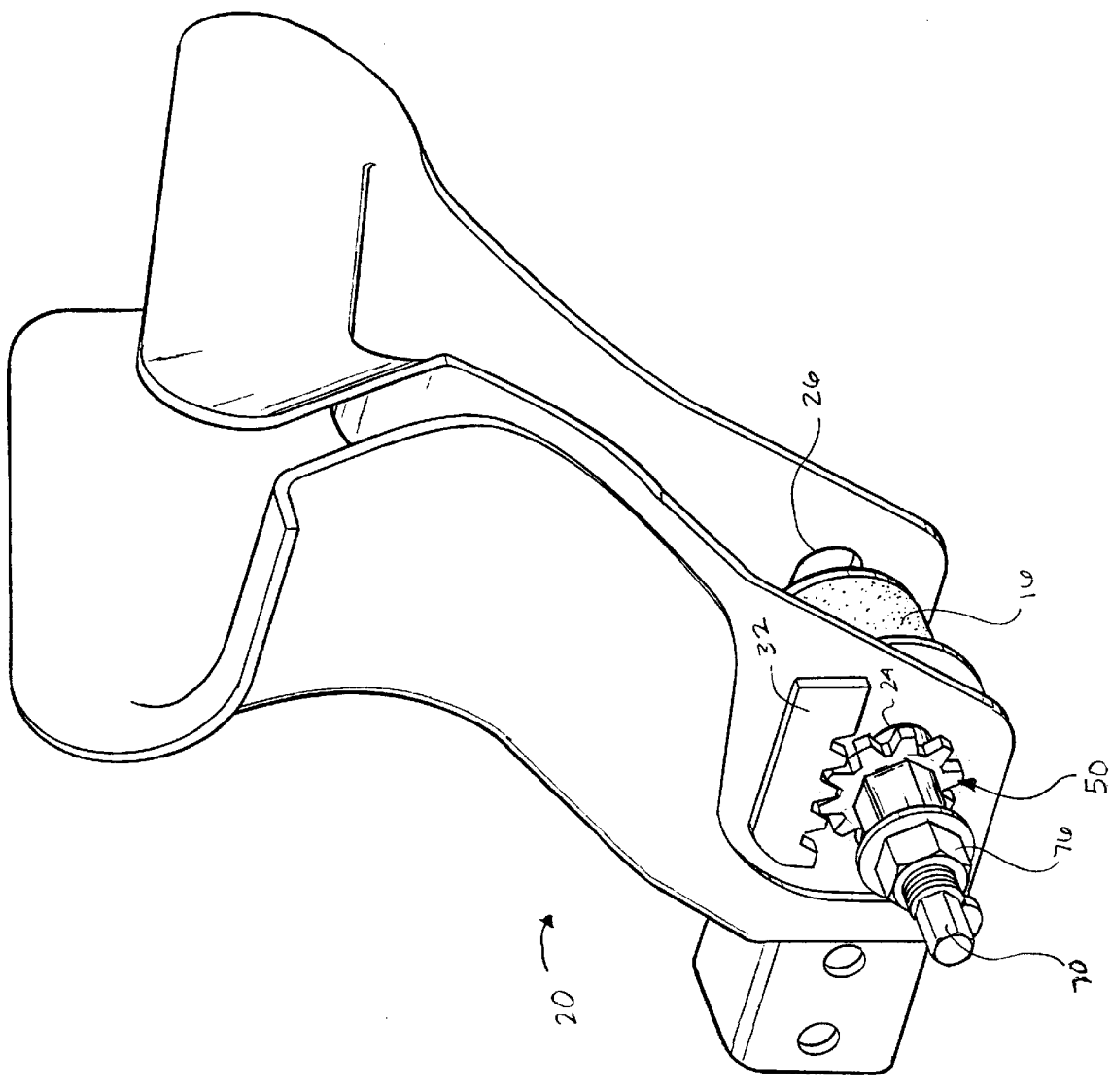
FIG. 3 is an assembled view of the alignment adjuster of the present invention.

FIG. 3 illustrates an assembled view of the camber/caster adjuster 20. To adjust the camber/caster, mating nut 76 is first loosened. Then hollow shaft 40 and hollow hex 50 are rotated, which causes the entire apparatus to move laterally depending on the direction of rotation. This lateral movement of bushing 16 affects the camber and caster of the wheel. It should be appreciated that the front bushing 16 and rear bushing 18 can both be adjusted with provides the necessary dimension to effectively adjust the alignment. When adjustment is complete, bolt 70 and nut 76 are tightened to once again hold hollow hex 50 and hollow shaft 40 in a specific position.

The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. An alignment adjuster for a motor vehicle including an adjustable member that is operatively connected to one of a plurality of wheels, said alignment adjuster comprising:

a bracket having a first and second opposing side wall, said first side wall having a first elongated slot, said second side wall having a second elongated slot;

a shaft having an opening formed therethrough and also having a first pinion gear connected thereto, said shaft adapted to be received by said first and said second elongated slot, said shaft adapted to be received by said adjustable member;

a hex having an opening formed therethrough and also having a second pinion gear connected thereto, said hex being coupled with said shaft such that rotational movement therebetween is limited, said hex including a tool receiving portion for aiding in the rotation of said hex and said shaft;

a first rack element associated with said first elongated slot and operatively contacting said first pinion gear;

a second rack element associated with said second elongated slot and operatively contacting said second pinion gear;

a bolt adapted to be received by said opening of said shaft and said opening of said hex, said bolt extending through said opening of said shaft and said opening of said hex to cooperate with a mating nut.

2. The alignment adjuster as set forth in claim 1, wherein said tool receiving portion of the hex is used to rotate said hex and consequently said shaft.

3. The alignment adjuster as set forth in claim 1, wherein the mating nut is adapted to receive said bolt to secure said hex and to a specific position.

* * * * *